United States Patent [19]

Livick

[11] Patent Number: 4,715,125
[45] Date of Patent: Dec. 29, 1987

[54] DOOR LOCK DRILLING TEMPLATE

[76] Inventor: Lester R. Livick, 15106 Beatty St., San Leandro, Calif. 94579

[21] Appl. No.: 939,419

[22] Filed: Dec. 8, 1986

[51] Int. Cl.$^4$ ...................... B27G 17/08; B23B 47/28
[52] U.S. Cl. .................................. 33/197; 408/115 R
[58] Field of Search ...................... 33/185 R, 194, 197, 33/640; 408/115 R, 115 B

[56] References Cited

U.S. PATENT DOCUMENTS

| | | | |
|---|---|---|---|
| 2,268,930 | 1/1942 | Edwards | 33/197 |
| 2,843,167 | 7/1958 | Rushton | 33/197 |
| 3,327,573 | 6/1967 | Prussiano | 408/115 R |
| 3,392,607 | 7/1968 | Gieseke | 408/115 R |
| 4,137,003 | 1/1979 | Budoff | 408/115 R |
| 4,306,823 | 12/1981 | Nashlund | 33/197 |
| 4,445,277 | 5/1984 | Keefe | 33/197 |
| 4,594,032 | 6/1986 | Warburg | 408/115 R |

Primary Examiner—Richard R. Stearns
Attorney, Agent, or Firm—Linval B. Castle

[57] ABSTRACT

A drilling template for accurately positioning latch holes and lock cutouts in door stiles. The template includes a pair of spaced, parallel, rectangular, frame member that are rigidly interconnected at one end. The frame members straddle a vertical door stile with the interconnecting end firmly against the edge of the stile. Clamps on one frame member are then tightened. A latch hole drilling guide is centered in a plate at the interconnecting end of the frame, and various diameter hole saw guides on removable side plates are positionable at any of a plurality of selected positions along the length of the frame to provide cutout positions for any of many lock backsets.

5 Claims, 5 Drawing Figures

DOOR LOCK DRILLING TEMPLATE

BRIEF SUMMARY OF THE INVENTION

This invention relates generally to drilling templates and in particular to a novel adjustable jig that is clamped to a door stile and includes drill and hole saw templates at any of a number of selectable positions for preparing the stile for the installation of a lock.

The template is comprised of a rigid U-shaped frame having an inside width to accomodate doors of standard thicknesses. An hole guide is centered in the end of the frame and provides a guide for a selection of drills suitable for boring a latch hole through the edge of the stile while larger hole saw templates adjustably positioned along the sides of frame provide guides for larger diameter hole saws to cut the lock openings at various backsets from the stile edge. Clamps on one side of the frame secure it to a door stile and, for thinner doors, shims separating the other frame side from the door will assure that the end latch hole is properly centered in the edge of the door stile. An additional feature of the invention is that the end plate containing the latch hole template includes a pair of adjustable and replacable points above and below the hole template which temporarily engage the wood of the door stile while the clamps are being tightened. These points not only temporarily secure the frame but also set and identify the proper location of latch plate screws that are to be subsequently installed to secure the lock in the door.

BRIEF DESCRIPTION OF THE DRAWINGS

In the drawings which illustrate the preferred embodiment of the invention.

DETAILED DESCRIPTION OF THE PREFERRED EMBODIMENT

Figure 1:
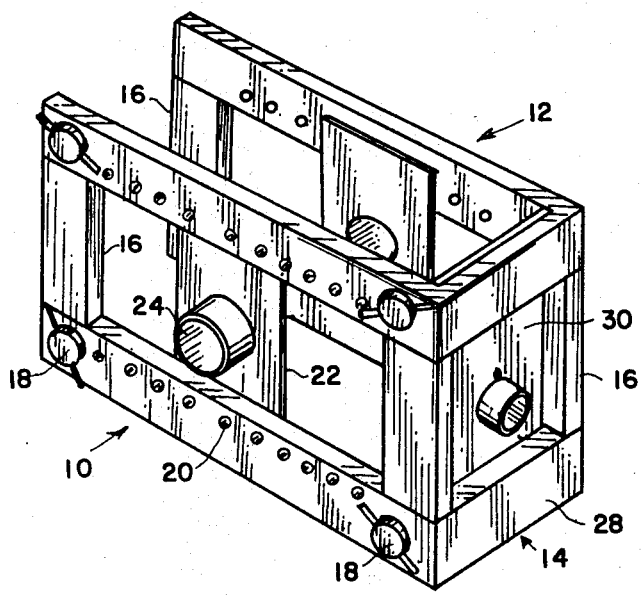
FIG. 1 is a perspective view of the door lock drilling template.

As illustrated in the perspective view of FIG. 1, the drilling template includes a pair of parallel side frames 10, 12 that are connected together by horizontal frame members at one end 14 and are open at the opposite end. Each of the individual side frame members 10, 12 are preferably formed of a strong lightweight bar stock and should be approximately seven inches or longer in length and connected by vertical corner members 16 to be approximately four to five inches in total height. The top and bottom connecting member at the end 14 may be the same strong material so that the side frames are rigid and will not readily flex from their parallel positions.

One of the side frame members 10 is provided with tightening screws 18 at each of its four corners so that the template may be secured to the edge of the vertical stile of a door which is to bored to receive a lock.

Figure 3:
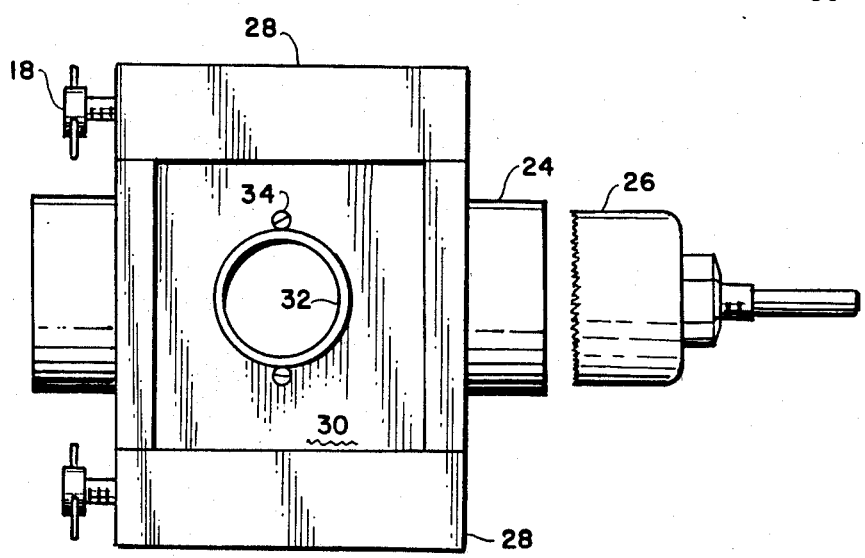
FIG. 3 is an elevational view taken from the closed end thereof.
Figure 4:
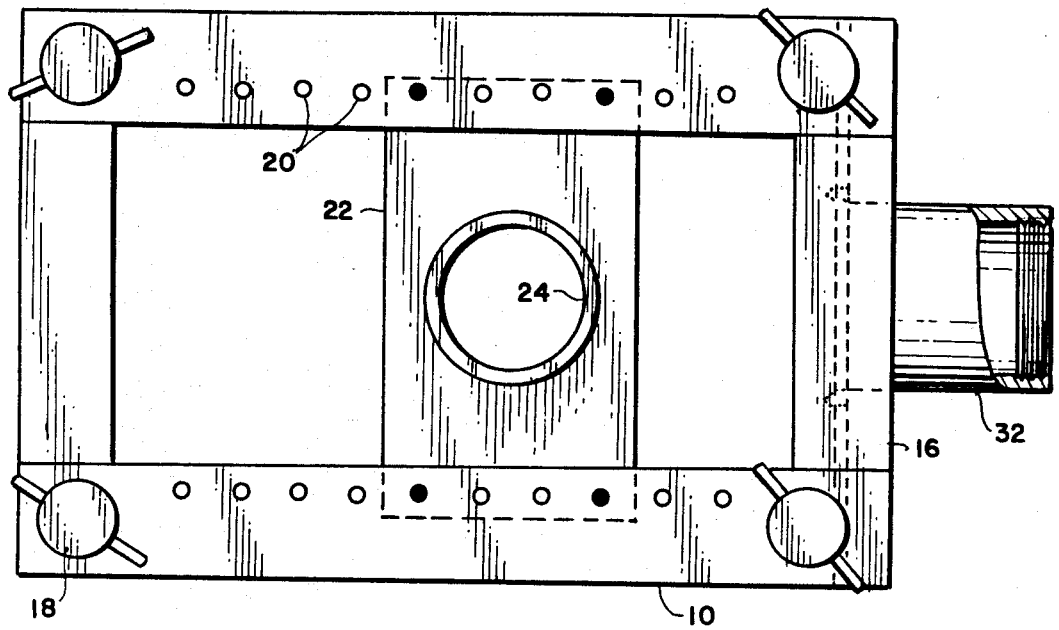
FIG. 4 is a first side elevational view thereof.

Each of the top and bottom horizontal members of the frames 10 and 12 have a series of holes 20 approximately an eighth inch in diameter horizontally bored through the member, as shown in FIG. 4. These holes accurately position on the inside surface of the frames the plates 22 which have one or more pins at the top and bottom for engaging a hole. Each plate 22 has centered therein and extending perpendicular thereto a tubular drilling guide 24, the inside diameter of which will accomodate a circular hole saw 26 as best illustrated in FIG. 3. Therefore, when the template is clamped to a door stile, the hole saw may accurately cut a circular lock cutout even though a previously cut smaller cutout existed or was positioned in a slightly different location on the stile.

The plates 22 and their hole saw drilling guides may be positioned at any of a number of positions along the template depending upon the desired lock backset. For example, a template having a total length of seven inches may serve to saw cutouts at backsets ranging from a minimum of about 2⅜ inches to about 5½ inches. Larger backsets are of course possible with longer templates. And various size cutout holes are readily available with circular drilling guides 24 and hole saws of various diameters from approximately 1¼ inches to over 3 inches.

Figure 5:
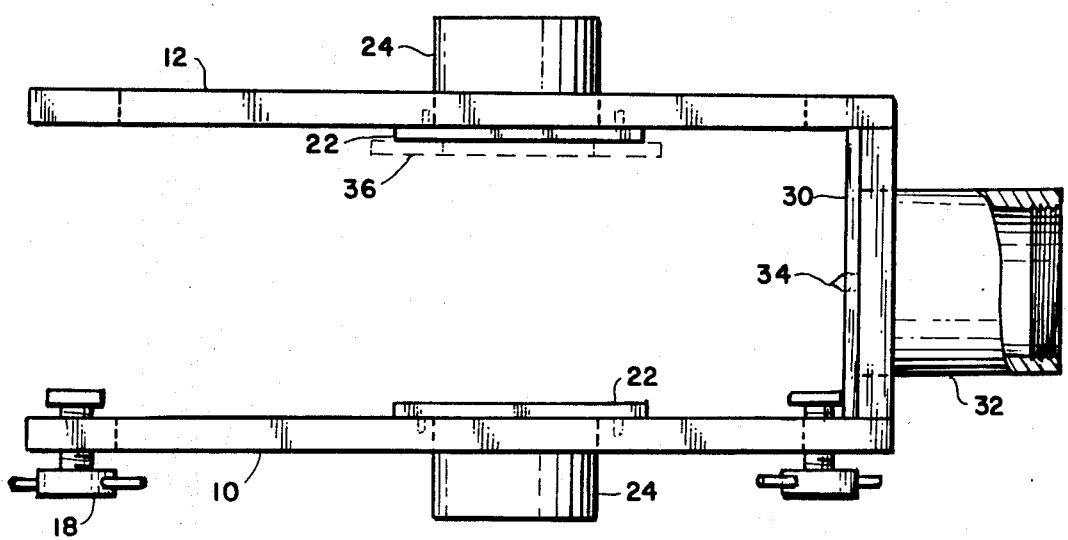
FIG. 5 is a plan view thereof.

The vertical members 16 and the connecting cross members 28 at the end 14 of the template form a frame to which is secured an end plate 30 which has vertically centered therein and extending perpendicularly outward therefrom a tubular drill guide 32 having an inside diameter of approximately one inch to intercept the larger lock opening cut by the hole saw. As best illustrated in FIGS. 4 and 5 the end of the bore of the drill guide 32 is threaded to receive externally threaded tubular shims (not shown) for reducing the effective inside diameter of the drill guide to approximately ½ inch to accomodate various types of latch mechanisms.

A feature of the template is the use of adjustable depth points 34 in end plate 30 and on the vertical centerline of the drill guide 32. The points 34 are preferably at the ends of screws threaded through the end plate 30 and are positioned above and below the drill guide at locations where they may serve as locators for the wood screws that secure the latch mechanism to the stile edge. The principle purpose for the points 34, however, is to assist in temporarily holding the template in a desired vertical position until the clamping screws 18 can be tightened. Thus, the installer can easily hold the template in the desired position with one hand until he can tighten the clamps with the other.

Figure 2:
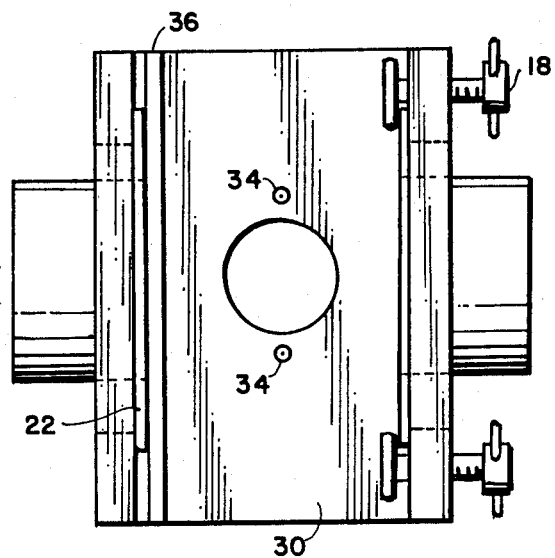
FIG. 2 is an open end elevational view thereof.

The interior width of the template, i.e. the space between the side frames 10, 12, should accomodate a door of 1¾ inches in thickness while maintaining the drill guide 32 centered on the edge of a door stile. Most residential interior doors are 1⅜ inches in thickness so that the drill guide 32 would normally be off center. This is easily remedied by inserting a 3/16 inch shim 36 against the side frame 12, as shown in FIGS. 2 and 5, and tightening the clamping screws 18 the extra 3/16 inch against the narrower door stile. The drill guide 32 then remains centered in the edge of the stile without affecting the cutting of the lock opening by a hole saw.

Having thus described my invention, what I claim is:

1. A template for the accurate cutting and drilling of latch and lock openings in a door stile, said template comprising:

first and second elongated parallel frame members rigidly connected together at their first end;

a pair of tubular hole cutting guides each connected to and extending laterally outward from a plate, said guides for receiving a circular saw;

means for attaching said hole cutting guides and connected plates to selected positions along said first and second frame members;

a tubular drilling guide connected to and extending outward and perpendicular to an end plate member secured to said first and second frame members at their said first end, said drilling guide for receiving a latch hole boring drill;

at least one pointed member longitudinally adjustable in said end plate member, said pointed member positioned in said end plate member to pierce a point on the vertical centerline of a door stile edge; and clamping means coupled to at least one of said parallel frame members for clamping the template to the edge of a door stile.

2. The template claimed in claim 1 wherein said rigidly connected parallel frame members are spaced apart to accomodate a door stile of at least 1¾ inches in thickness, and said tubular drilling guide is positioned on its end plate members to align with the vertical centerline of a door stile edge.

3. The template claimed in claim 1 wherein the plates supporting said laterally extending hole cutting guides are coupled to said frame members by pins laterally extending from said plates into holes located at preselected positions along the lengths of said frame members.

4. The template claimed in claim 3 wherein said tubular drilling guide has a threaded bore for receiving externally threaded tubular shims for receiving drills of smaller diameter than that of said drilling guide.

5. The template claimed in claim 1 wherein said pointed member is formed on the end of a screw threaded into said end plate member and wherein there are two of said pointed members on said vertical centerline and equally spaced above and below the center of said tubular drilling guide.

* * * * *